(12) United States Patent
Ikoma et al.

(10) Patent No.: US 6,525,766 B1
(45) Date of Patent: Feb. 25, 2003

(54) COMBINATION CAMERA

(75) Inventors: Ken Ikoma, Yokohama (JP); Kazushige Tamura, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/830,753

(22) PCT Filed: Aug. 31, 2000

(86) PCT No.: PCT/JP00/05935

§ 371 (c)(1),
(2), (4) Date: Apr. 30, 2001

(87) PCT Pub. No.: WO01/17235

PCT Pub. Date: Mar. 8, 2001

(30) Foreign Application Priority Data

Sep. 1, 1999 (JP) .......................................... 11-248051

(51) Int. Cl.$^7$ ................................................. H04N 7/18
(52) U.S. Cl. ........................ 348/151; 348/143; 348/373; D16/203
(58) Field of Search .................. 348/143, 151, 348/373; D16/203; 396/427; 220/213

(56) References Cited

U.S. PATENT DOCUMENTS

| | | | | |
|---|---|---|---|---|
| 3,993,866 A | * | 11/1976 | Pearl et al. .................. | 348/151 |
| 4,160,999 A | * | 7/1979 | Claggett ..................... | 348/151 |
| 4,920,367 A | * | 4/1990 | Pagano ....................... | 348/151 |
| 5,455,625 A | * | 10/1995 | Englander ................... | 348/375 |
| D388,450 S | * | 12/1997 | Hamano et al. ........... | D16/203 |
| 5,852,754 A | * | 12/1998 | Schneider ................... | 348/143 |
| D412,924 S | * | 8/1999 | Hiraguchi .................. | D16/219 |
| D415,509 S | * | 10/1999 | Hiraguchi .................. | D16/203 |
| 6,061,087 A | * | 5/2000 | Schieltz et al. ............. | 348/151 |
| 6,268,882 B1 | * | 7/2001 | Elberbaum .................. | 348/151 |
| 6,292,222 B1 | * | 9/2001 | Bernhardt ................... | 348/375 |

FOREIGN PATENT DOCUMENTS

| | | | | |
|---|---|---|---|---|
| JP | 60-29908 | * | 2/1985 | ............ G11B/5/10 |
| JP | 60-242503 | | 12/1985 | |
| JP | 7-43810 | | 2/1995 | |
| JP | 7-198480 | | 8/1995 | |
| JP | 7-303201 | | 11/1995 | |
| JP | 9-211626 | | 8/1997 | |
| JP | 9-219805 | | 8/1997 | |
| JP | 10-216666 | | 8/1998 | |
| JP | 2000-013038 | | 1/2000 | |

* cited by examiner

Primary Examiner—Wendy R. Garber
Assistant Examiner—Lin Ye
(74) Attorney, Agent, or Firm—Pearne & Gordon LLP

(57) ABSTRACT

An opening formed in a hemispherical portion decreases the rigidity of a camera cover, whereby the camera cover is easy to deform due to the lateral external pressure.

In a composite camera in which a camera body is housed in a camera box (1) attached onto a ceiling or the like through a camera base (2) so that it can turn and swing up and down, and the aforesaid camera body is covered with a hemispherical camera cover (3) having an opening (3f) from which a lens (4) of the camera body protrudes, the camera cover (3) is composed of a cylindrical portion (3a), a hemispherical portion (3b) and a reinforcing step portion (3c) that connects these cylindrical portion (3a) and hemispherical portion (3b), and ring-shaped edges formed at boundaries between the cylindrical portion (3a) and the reinforcing step portion (3c) and between the reinforcing step portion (3c) and the hemispherical portion (3b) improve the lateral rigidity of the camera cover (3). Therefore, the camera cover (3) does not deform due to the lateral external forces, whereby even when the camera body is turned, the camera cover (3) does not interfere with a turn means and the like.

9 Claims, 6 Drawing Sheets

COMBINATION CAMERA

TECHNICAL FIELD

The present invention relates to a camera of a composite camera mainly used as a surveillance camera.

BACKGROUND ART

In a system that keeps watch in buildings or watch in shops such as a pinball house, a bookstore and the like, a composite camera as shown in FIG. 6 has been conventionally used well.

The aforesaid composite camera is also referred to as a dome camera, in which a camera body (not shown) is housed in a camera box b attached onto a ceiling or the like through a camera base a so that it can turn and swing. A camera cover c made of metal and formed hemispherically covers the camera body from the underside, and the camera cover c has a shield function of hiding an inside electric circuit and simultaneously preventing unnecessary radiation produced from the electric circuit from being emitted outside.

Further, in the camera cover c, a circular arc-shaped opening e from which a lens d of the camera body protrudes is formed, and the camera cover c is covered with a hemispherical transparent cover f attached to an opening portion of the camera box b.

In the thus structured composite camera, while the camera body is turning at an angle of 360 degrees according to instructions from a surveillant center, it simultaneously swings up and down nearly at an angle of 90 degrees to take pictures of every corner in the room or in the shop and send the video pictures to the surveillant center. When the camera body turns, the camera cover c also turns in the horizontal direction as shown in FIG. 7A. Further, when the camera body swings up and down, it swings up and down in the opening e of the camera cover c as shown in FIG. 7A.

However, the aforesaid composite camera in which the camera body swings up and down at the angle of 90 degrees requires, after the camera body was swung downward and the lens d was moved from A point to B point to take pictures, in case that pictures are taken from A point to B point on the opposite side to the previous side, an operation of swinging the camera body upward while the camera body is being turned at an angle of 180 degrees thereby to return the lens d to the A point. Therefore, it takes some times to take pictures on the opposite side, so that there is a disadvantage that this camera cannot correspond to an emergency.

In order to solve this disadvantage, a composite camera in which a camera body can swing up and down at an angle of 180 degrees is put to practical use.

In this composite camera, in order to swing the lens d of the camera body at the angle of 180 degrees, a circular arc-shaped opening e' is formed in the camera cover c nearly over the angle of 180 degrees in the vertical direction as shown in FIG. 7B. After the camera body was swung up and down at an angle of 90 degrees and pictures from the A point to the B point were obtained, in case that pictures on the opposite side are required, the camera body is further swung upward and the lens d is moved from the B point to C point, whereby the pictures on the opposite side are obtained without turning the camera body. Therefore, this camera can correspond also to an emergency quickly.

However, in case that the circular arc-shaped opening g was formed in the camera cover c nearly over the angle of 180 degrees, rigidity of the camera cover c decreased, and the camera cover c was deformed by pressure received from parts to which the camera cover c is attached, so that the camera cover c interfered with means for turning and swinging the camera body and with the transparent cover f for covering the camera cover c, whereby there were disadvantages that the camera body could not turn and swing smoothly, the interfering parts were broken, and the like.

This invention has been made in order to improve the above conventional disadvantages, and its object is to provide at a low price a composite camera that can provide an opening nearly over an angle of 180 degrees without decreasing the rigidity of the camera cover.

DISCLOSURE OF INVENTION

In order to achieve the aforesaid object, a composite camera according to the invention is a composite camera having the following constitution (1): In a composite camera in which a camera body is housed in a camera box attached onto a ceiling or the like through a camera base so that it can turn and swing up and down, and the aforesaid camera body is covered with a hemispherical camera cover having an opening from which a lens of the camera body protrudes, the aforesaid camera cover is composed of a cylindrical portion, a hemispherical portion and a reinforcing step portion that connects these cylindrical portion and hemispherical portion.

According to the above constitution (1), ring-shaped edges are formed at boundaries between the cylindrical portion and the reinforcing step portion and between the reinforcing step portion and the hemispherical portion. Resultantly, the lateral rigidity of the camera cover is improved by these edges, and when the camera cover is attached so as to cover the camera body, it does not deform even upon reception of the lateral external forces from attaching parts. Therefore, in case that this camera is used as a surveillant camera, the camera cover does not interfere with a turning means, a swinging means, a transparent cover, and the like.

In order to achieve the aforesaid object, the composite camera of the invention is a composite camera according to the first aspect (1) of the invention, in which (2) both ends of the opening formed in the hemispherical portion of the aforesaid camera cover are bent inward thereby to form turnups at the both ends of the opening.

According to the above constitution (2), edges are formed at bending portions of the turnups and the rigidity of the hemispherical portion increases. Therefore, even in case that the opening is formed in the hemispherical portion nearly over a semicircle, it is possible to hold down the decrease of the rigidity of the hemispherical portion to the minimum.

In order to achieve the aforesaid object, the composite camera of the invention is a composite camera according to the first aspect (1) or the second aspect (2) of the invention, in which (3) the aforesaid camera cover is formed integrally by press-molding a metal plate.

According to the above constitution (3), the camera cover can be manufactured readily and at a low price, and it can be made lighter. Therefore, this camera can correspond also to high-speed turn.

Figure 1:
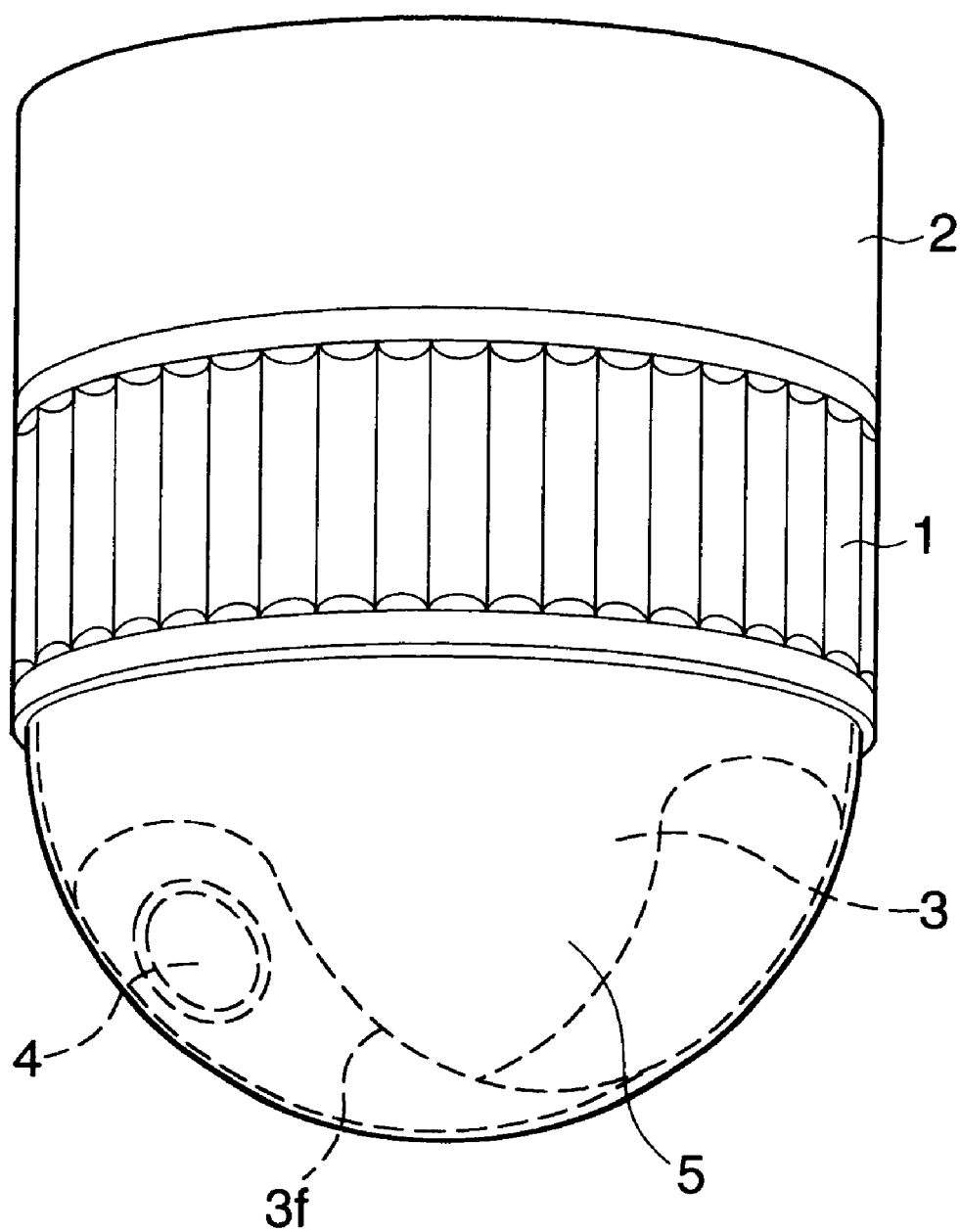
FIG. 1 is a perspective view of a composite camera to which a camera cover that is a mode for carrying out the invention is applied.

In the figures, reference numeral 1 is a camera box, 2 is a camera base, 3 is a camera cover, 3a is a cylindrical portion, 3b is a hemispherical portion, 3c is a reinforcing step portion, 3d and 3e are edges, 3f is an opening, 3g is a turnup, 3h is an edge, 4 is a lens, and 5 is a transparent cover.

BEST MODE FOR CARRYING OUT THE INVENTION

An embodiment of the invention will be described in detail below with reference to FIGS. 1 to 5.

Figure 2:
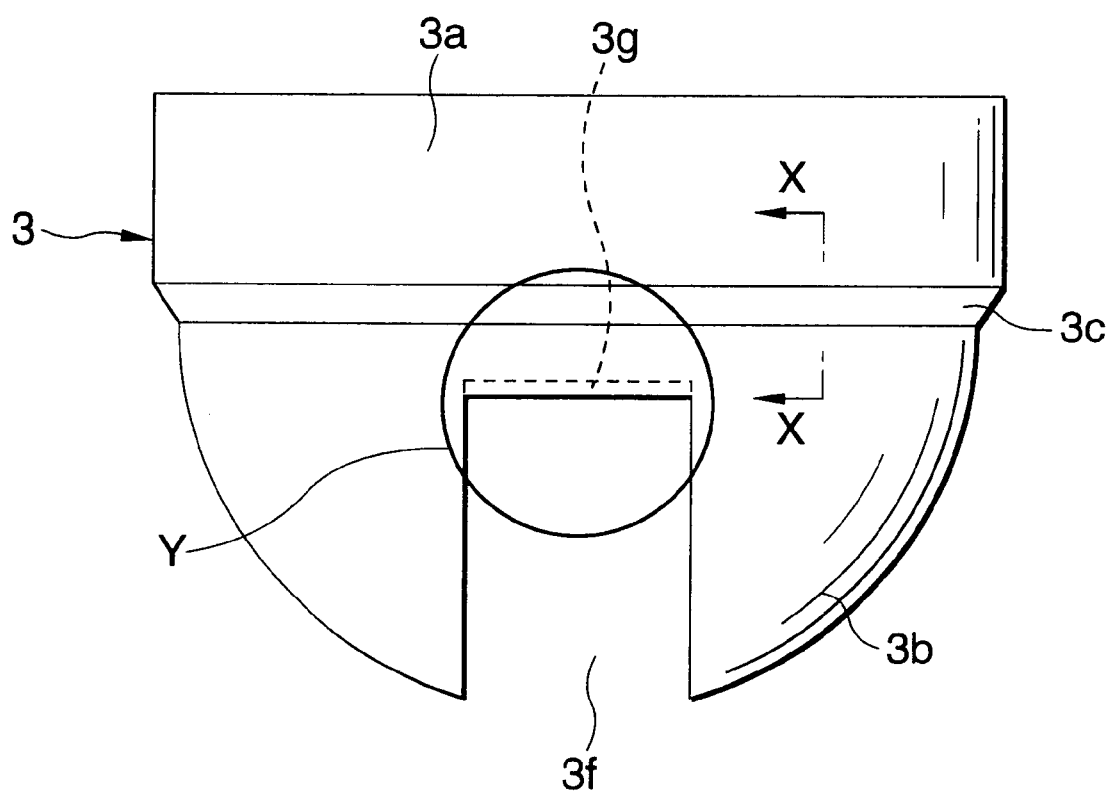
FIG. 2 is a front view of the camera cover that is the mode for carrying out the invention.
Figure 3:
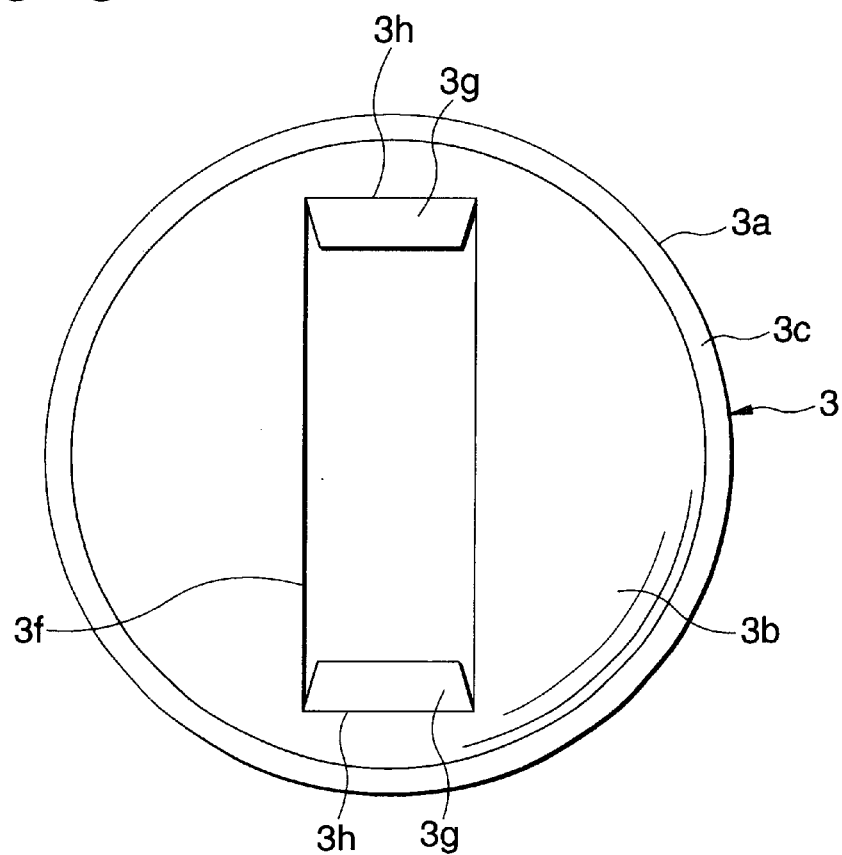
FIG. 3 is a plain view of the camera cover that is the mode for carrying out the invention.
Figure 4:
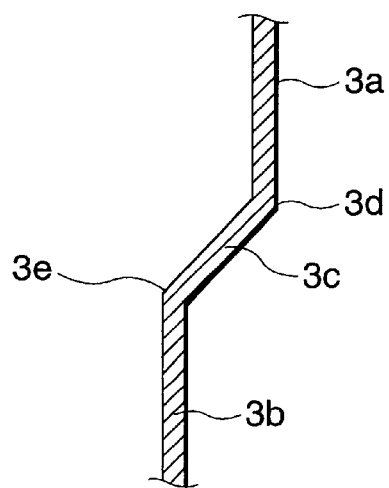
FIG. 4 is a sectional view taken along a line X—X of FIG. 2.
Figure 5:
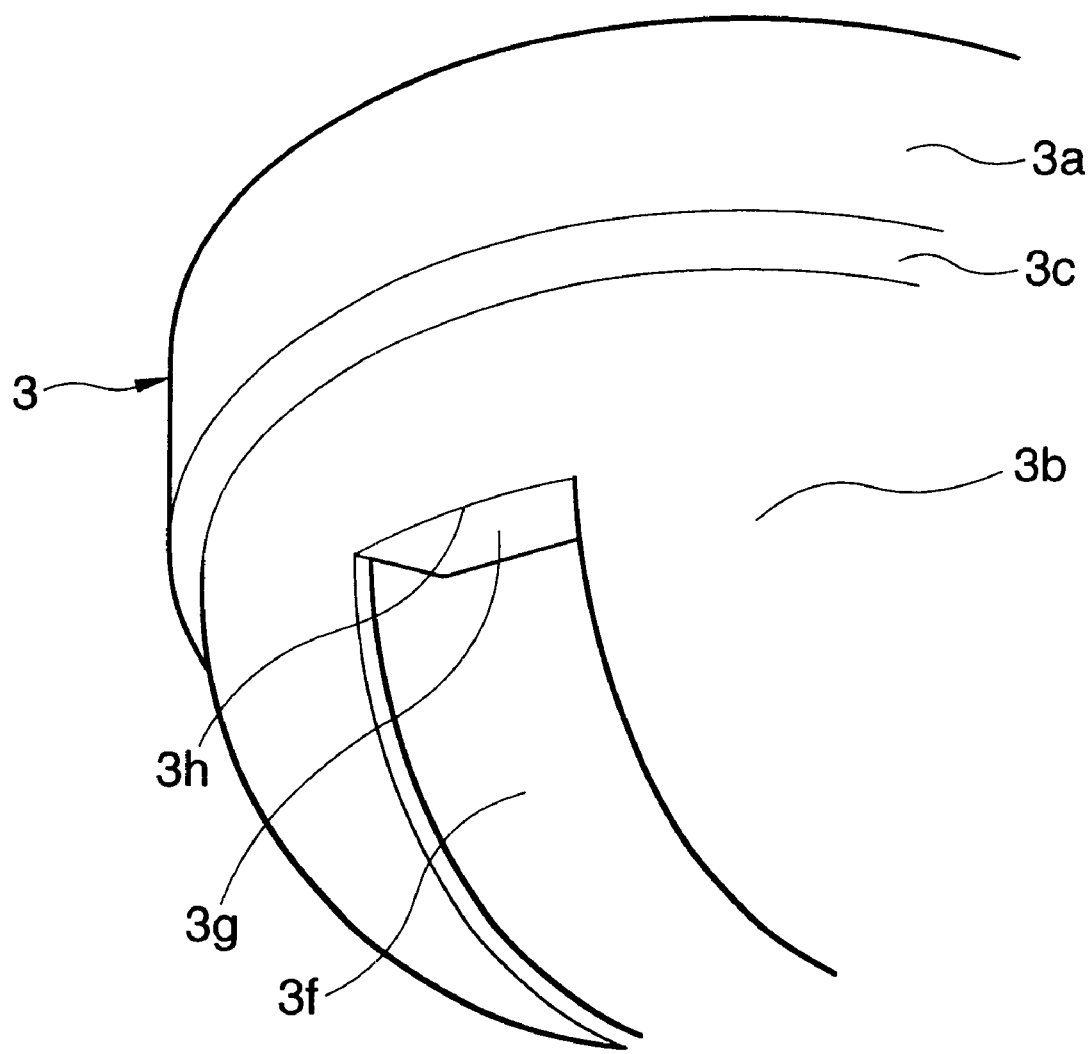
FIG. 5 is an enlarged perspective view in a circle Y of FIG. 2.
Figure 6:
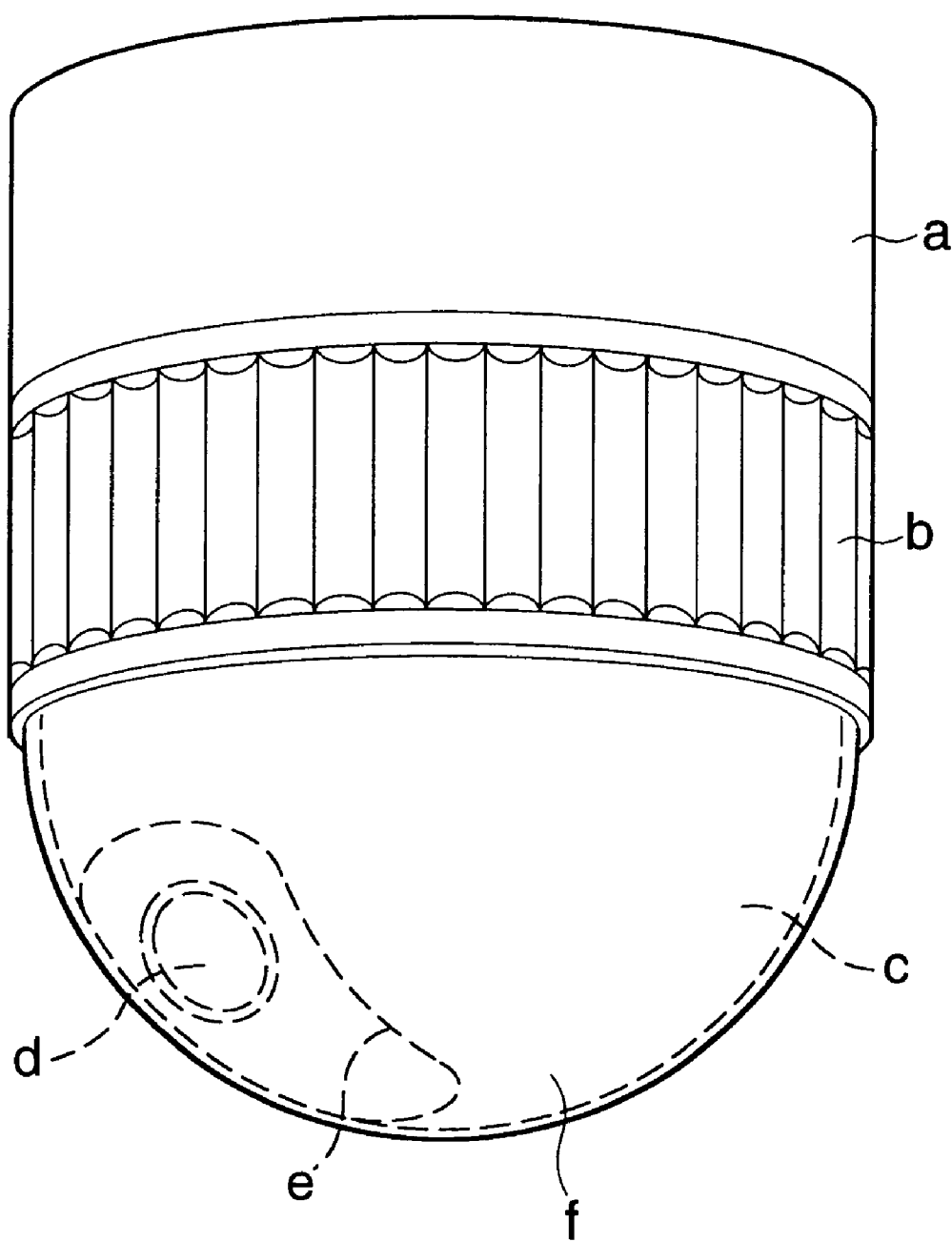
FIG. 6 is a perspective view of a conventional composite camera.
Figure 7A:
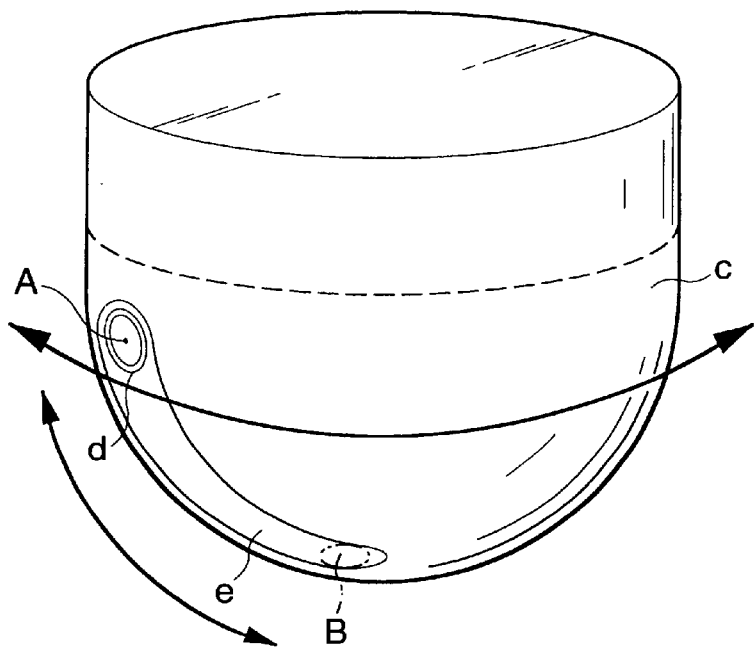
FIGS. 7A and 7B are diagrams for explaining a working of a camera cover in the conventional composite camera.
Figure 7B:
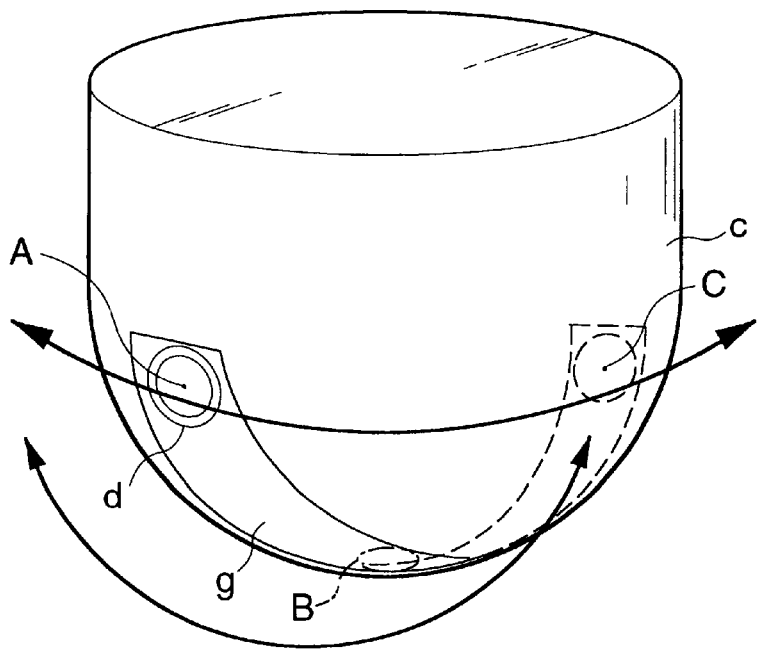

FIG. 1 is a perspective view of a composite camera to which a camera cover according to the embodiment of the invention is applied, FIG. 2 is a front view of the camera cover according to the embodiment of the invention, FIG. 3 is a plain view of the same, FIG. 4 is a sectional view taken along a line X—X of FIG. 2, and FIG. 5 is an enlarged perspective view in a circle Y of FIG. 2.

In FIG. 1, a camera box 1 houses a camera body (not shown) therein and is attached through a camera base 2 to the predetermined position, for example, a ceiling or the like.

In the camera box 1, the camera body is provided so that it can be turned at an angle of 360 degrees by a turn means (not shown) and so that it can be swung up and down nearly at an angle of 180 degrees by a swing means (not shown), and the camera body is covered with a camera cover 3 formed integrally by metal from its downside.

The aforesaid camera cover 3, as shown in FIG. 2, has a cylindrical portion 3a at its upper portion and a hemispherical portion 3b at its lower portion. The cylindrical portion 3a and the hemispherical portion 3b are joined by a tapered reinforcing step portion 3c whose diameter becomes smaller toward the hemispherical portion 3b side from the cylindrical portion 3a side. This reinforcing step portion 3c strengthens the lateral rigidity of the camera cover 3.

Namely, by providing the tapered reinforcing step portion 3c between the cylindrical portion 3a and the hemispherical portion 3b, two edges 3d, 3e are formed at boundaries between the cylindrical portion 3a and the step portion 3c and between the step portion 3c and the hemispherical portion 3b, as shown in FIG. 4.

These edges 3d, 3e, since they are formed in the shape of a ring, have strong repulsion forces in relation to external forces applied from the lateral direction, whereby the lateral rigidity of the camera cover 3 improves. Therefore, it is possible to prevent the camera cover 3 from being deformed by the external pressure.

On the other hand, in the hemispherical portion 3b of the camera cover 3, an opening 3f is formed in the shape of a circle arc nearly over semicircle in the up-and-down direction.

A lens 4 of the camera body protrudes from this opening 3f. In order to prevent the decrease of the rigidity of the camera cover 3 caused by providing this opening 3f, turnups 3g are formed at both ends of the opening 3f.

The turnups 3g, by bending end portions of the opening 3f inward when the opening 3f is formed in the hemispherical portion 3b, are formed, and edges 3h are formed at bending portions of the turnups 3g as shown in FIG. 5. Therefore, these edges 3h make the rigidity of the hemispherical portion 3b strong.

Further, the peripheral surface of the camera cover 3 is covered with a hemispherical transparent cover 5 attached to the opening of the camera box 1 to constitute the whole of the composite camera.

Next, working of the above-constituted camera cover will be described.

The aforesaid camera cover 3 is formed by integrally molding a metal plate using a metal mold, and since the reinforcing step portion 3c, the opening 3f, and the turnups 3g are simultaneously formed at the molding time, the camera cover can be manufactured readily.

Further, in the molded camera cover 3, the reinforcing step portion 3c is formed between the cylindrical portion 3a and the hemispherical portion 3b, and the turnups 3g are formed at the both ends of the opening 3f, so that the lateral rigidity of the whole of the camera cover 3 improves more by the edges 3d, 3e, 3h produced by these reinforcing step portion 3c and the turnups 3g than the conventional cover. Therefore, when the camera cover 3 is built in the camera box 1 so as to cover the camera body, it does not deform even if the lateral external forces are applied to the camera cover. Hereby, even if the camera body is turned and swung up and down at the angle of 180 degrees, it is possible to prevent the camera cover 3 from interfering with the drive portions of the turn means and swing means, the transparent cover 5, and the like.

On the other hand, working in case that a composite camera using the camera cover 3 is used as a surveillant camera is the same as that using the conventional composite camera. However, since the camera body can be swung up and down nearly at the angle of 180 degrees, for example, the composite camera can follow continuously a person passing below the surveillant camera since he came toward the surveillant camera till he passes below the surveillant camera and leaves the surveillant camera, that is, the composite camera can correspond also to emergencies.

INDUSTRIAL APPLICATION

As described above, according to the invention, since the camera cover covering the camera body is composed of the cylindrical portion, the hemispherical portion and the reinforcing step portion provided between these cylindrical portion and hemispherical portion, the ring-shaped edges formed at the boundaries between the cylindrical portion and the different-in-level portion and between the step portion and the hemispherical portion improve the lateral rigidity of the camera cover; and when the camera cover is attached so as to cover the camera body, it does not deform even if the lateral external forces are applied to it by the attaching parts and the like. Therefore, in case that the composite camera is used as a surveillant camera, the camera cover does not interfere with the turn means, the swing means, the transparent cover, and the like.

Hereby, since the turn and swing of the camera body can be smoothly performed, the composite camera can readily correspond also to emergencies, and durability of the composite camera can be further improved since excessive loads are not applied to the turn means and the swing means of the camera body.

What is claimed is:

1. A composite camera comprising:
   a camera box attached onto a predetermined position;
   a camera body housed in the camera box so that the camera body can turn and swing up and down; and
   a hemispherical camera cover covering the camera body and forming an opening from which a lens of the camera body protrudes, wherein the camera cover includes:
   a cylindrical portion;
   a hemispherical portion;
   a reinforcing step portion for connecting the cylindrical portion and the hemispherical portion;
   a first tab portion at one end of the opening; and
   a second tab portion at another end of the opening, wherein both the first tab portion and the second tab portion are bent inward to form turnups.

2. A composite camera according to claim 1, wherein the camera cover is formed by integrally molding a metal plate.

3. A composite camera comprising:
   a camera box attached onto a predetermined position;
   a camera body housed in the camera box so that the camera body can turn and swing up and down; and
   a hemispherical camera cover covering the camera body and forming an opening from which a lens of the camera body protrudes, wherein the camera cover includes:
   a cylindrical portion;
   a hemispherical portion;
   a reinforcing step portion for connecting the cylindrical portion and the hemispherical portion,
   a first tab portion bent inward to form a reinforcing turnup at one end of the opening; and
   a second tab portion bent inward to form a reinforcing turnup at a second end of the opening,
   wherein the camera cover is formed by integrally molding a metal plate using a metal mold.

4. The composite camera according to claim 3, wherein the opening is formed in a circular arc encompassing nearly a semi-circle.

5. A composite camera comprising:
   a camera box attached onto a predetermined position;
   a camera body housed in the camera box so that the camera body can turn and swing up and down; and
   a hemispherical integrated camera cover covering the camera body and forming an slot from which a lens of the camera body protrudes, wherein the slot is formed in a circular arc encompassing nearly a semi-circle, and further wherein the integrated camera cover includes:
   a cylindrical portion;
   a hemispherical portion; and
   a reinforcing step portion for connecting the cylindrical portion and the hemispherical portion forming the camera cover as a single, continuously integrated piece;
   a first inwardly bent tab portion bent at one end of said slot for reinforcing the integrated camera cover; and
   a second inwardly bent tab portion at a second end of the slot also for reinforcing the integrated camera cover.

6. The composite camera according to claim 5, wherein the camera cover is formed by integrally molding a metal plate.

7. A composite camera comprising:
   a camera box attached onto a predetermined position;
   a camera body housed in the camera box so that the camera body can turn and swing up and down; and
   a hemispherical camera cover covering the camera body and forming an opening from which a lens of the camera body protrudes, wherein the camera cover includes a first tab bent inward to form a reinforcing turnup at one end of the opening and a second tab bent inward to form a reinforcing turnup at a second end of the opening, and further wherein the camera cover includes:
   a cylindrical portion;
   a hemispherical portion; and
   a reinforcing step portion for connecting the cylindrical portion and the hemispherical portion.

8. The composite camera according to claim 7, wherein the camera cover is formed by integrally molding a metal plate.

9. A composite camera comprising:
   a camera box attached onto a predetermined position;
   a camera body housed in the camera box so that the camera body can turn and swing up and down; and
   a hemispherical camera cover covering the camera body and forming an opening from which a lens of the camera body protrudes, wherein the opening is formed in a circular arc encompassing nearly a semi-circle, and further wherein the camera cover includes:
   a first tab bent inward to form a reinforcing turnup at one end of the opening;
   a second tab bent inward to form a reinforcing turnup at a second end of the opening;
   a cylindrical portion;
   a hemispherical portion; and
   a reinforcing step portion for connecting the cylindrical portion and the hemispherical portion,
   wherein the camera cover is formed by integrally molding a metal plate.

* * * * *